US011211998B2

(12) United States Patent
Dong et al.

(10) Patent No.: US 11,211,998 B2
(45) Date of Patent: Dec. 28, 2021

(54) VIRTUAL WIRELESS NETWORK

(71) Applicant: Baylor University, Waco, TX (US)

(72) Inventors: Liang Dong, Woodway, TX (US);
Jonathan Hu, Woodway, TX (US);
Yang Li, Waco, TX (US)

(73) Assignee: Baylor University, Waco, TX (US)

( * ) Notice: Subject to any disclaimer, the term of this patent is extended or adjusted under 35 U.S.C. 154(b) by 173 days.

(21) Appl. No.: 16/373,935

(22) Filed: Apr. 3, 2019

(65) Prior Publication Data
US 2020/0322039 A1    Oct. 8, 2020

(51) Int. Cl.
| | |
|---|---|
| *H04B 7/14* | (2006.01) |
| *H04B 7/185* | (2006.01) |
| *H04L 5/00* | (2006.01) |
| *H04L 12/46* | (2006.01) |
| *H04L 12/66* | (2006.01) |
| *H04W 72/04* | (2009.01) |

(Continued)

(52) U.S. Cl.
CPC ....... *H04B 7/18506* (2013.01); *H04L 5/0048* (2013.01); *H04L 12/4641* (2013.01); *H04L 12/66* (2013.01); *H04W 72/0453* (2013.01); *H04W 84/12* (2013.01); *H04W 88/08* (2013.01)

(58) Field of Classification Search
CPC ................................................. H04B 7/18506
See application file for complete search history.

(56) References Cited

U.S. PATENT DOCUMENTS 9,538,457 B2 * 1/2017 Syed ..................... H04W 48/16
10,313,945 B2 * 6/2019 Sankaranarayanan .......................
   H04W 24/02

(Continued)

FOREIGN PATENT DOCUMENTS

| EP | 2785093 A1 | 10/2014 |
|---|---|---|
| WO | 2015097482 A1 | 7/2015 |
| WO | 2016067017 A1 | 5/2016 |

OTHER PUBLICATIONS

Jaskolski, J., International Search Report for International Patent Application No. PCT/US2019/035369, dated Aug. 22, 2019, European Patent Office.

(Continued)

*Primary Examiner* — Guang W Li
(74) *Attorney, Agent, or Firm* — Jackson Walker, LLP

(57) ABSTRACT

Disclosed virtual wireless networks include a network controller interconnected with wireless access points by a broadband backbone. The controller may include or interface with a gateway coupling the virtual network to the Internet via one or more interim networks. The broadband backbone includes network switches and broadband interconnects interconnecting the wireless access points and the network controller. The broadband backbone may be implemented as an optical backbone and the broadband interconnects may include one or more optical fiber interconnects. The network controller may control the manner in which mobile devices connect to wireless access points. The network controller may configure the wireless access points to present, to mobile devices within the isolated environment, the plurality of physical wireless cells provided by the plurality of individual wireless access points as a single (Continued)

virtual wireless network. The network controller may also assign wireless connections between mobile devices and wireless access points.

27 Claims, 4 Drawing Sheets

(51) Int. Cl.
  *H04W 84/12* (2009.01)
  *H04W 88/08* (2009.01)

(56) References Cited

U.S. PATENT DOCUMENTS

| | | | |
|---|---|---|---|
| 10,327,186 B2* | 6/2019 | Kaushik | H04W 48/12 |
| 10,749,746 B2* | 8/2020 | Thubert | H04L 41/0836 |
| 2004/0156399 A1 | 8/2004 | Eran | |
| 2006/0221916 A1* | 10/2006 | Taylor | H04L 63/0272 |
| | | | 370/338 |
| 2007/0081477 A1* | 4/2007 | Jakkahalli | H04L 12/4645 |
| | | | 370/310 |
| 2008/0049703 A1* | 2/2008 | Kneckt | H04W 68/00 |
| | | | 370/342 |
| 2009/0195461 A1 | 8/2009 | Hirt | |
| 2009/0227230 A1* | 9/2009 | Camilleri | H04W 8/26 |
| | | | 455/408 |
| 2009/0310528 A1* | 12/2009 | Tamura | H04W 12/06 |
| | | | 370/315 |
| 2010/0296401 A1* | 11/2010 | Karaoguz | H04W 24/02 |
| | | | 370/252 |
| 2011/0019639 A1* | 1/2011 | Karaoguz | H04W 36/0055 |
| | | | 370/331 |
| 2011/0258696 A1* | 10/2011 | Iyer | H04L 63/1466 |
| | | | 726/14 |
| 2013/0148609 A1* | 6/2013 | Ram | H04W 72/0433 |
| | | | 370/329 |
| 2014/0050167 A1* | 2/2014 | Smedman | H04W 48/16 |
| | | | 370/329 |
| 2014/0126466 A1* | 5/2014 | Hamdi | H04W 12/08 |
| | | | 370/328 |
| 2014/0201383 A1* | 7/2014 | Kuehnel | H04W 88/06 |
| | | | 709/231 |
| 2014/0269648 A1* | 9/2014 | Unnimadhavan | H04W 8/20 |
| | | | 370/338 |
| 2015/0043382 A1* | 2/2015 | Arora | H04L 41/20 |
| | | | 370/254 |
| 2016/0014678 A1 | 1/2016 | Syed et al. | |
| 2016/0066201 A1* | 3/2016 | Kerpez | H04W 72/082 |
| | | | 370/252 |
| 2016/0066227 A1* | 3/2016 | Townend | H04L 5/0048 |
| | | | 370/331 |
| 2016/0100399 A1* | 4/2016 | Kaushik | H04W 36/08 |
| | | | 370/338 |
| 2016/0330077 A1* | 11/2016 | Jin | H04L 41/0806 |
| 2018/0124646 A1* | 5/2018 | Thubert | H04W 48/18 |
| 2018/0279130 A1* | 9/2018 | Huang | H04W 24/02 |
| 2018/0302783 A1* | 10/2018 | Mestanov | H04W 8/22 |
| 2018/0310240 A1 | 10/2018 | Kannan | |
| 2018/0310279 A1* | 10/2018 | Pathak | H04W 16/10 |
| 2019/0215753 A1* | 7/2019 | Sathya | H04W 40/10 |
| 2019/0312787 A1* | 10/2019 | Ran | H04L 61/2007 |
| 2019/0373539 A1* | 12/2019 | Chen | H04W 24/08 |
| 2020/0021400 A1* | 1/2020 | Cherian | H04L 1/1685 |
| 2020/0036618 A1* | 1/2020 | Asterjadhi | H04W 24/02 |
| 2020/0137629 A1* | 4/2020 | Granier | H04W 28/08 |
| 2020/0274756 A1* | 8/2020 | Gan | H04W 88/08 |
| 2021/0045052 A1* | 2/2021 | Nellore | H04W 48/14 |

OTHER PUBLICATIONS

Jaskolski, J., Written Opinion for International Patent Application No. PCT/US2019/035369, dated Aug. 22, 2019, European Patent Office.

Hartweg, N., International Search Report for International Patent Application No. PCT/US2020/026509 dated Jul. 1, 2020, European Patent Office.

Hartweg, N., Written Opinion for International Patent Application No. PCT/US2020/026509 dated Jul. 1, 2020, European Patent Office.

* cited by examiner

VIRTUAL WIRELESS NETWORK

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

Disclosed subject matter pertains to wireless communication networks and, more particularly, providing wireless connectivity to mobile electronic devices.

Related Art

Smart phones, tablet devices, and other mobile electronic devices, generically referred to herein simply as mobile devices, generally include one or more wireless transceivers and supporting hardware, software, and firmware resources that comply with one or more wireless networking standards including one or more IEEE 802.11 standards, commonly referred to as WiFi. Among other applications, WiFi is widely deployed to provide Internet access to mobile devices within range of a WiFi-enabled wireless access point that is directly or indirectly coupled to the Internet.

In conventional WiFi, a wireless access point establishes, provides, and/or supports a WiFi cell. The effective radius of a WiFi cell may be influenced by numerous factors, including environmental features, the frequency of the applicable carrier signal, and the rated power of the wireless access point's wireless transceiver, but the effective radius is generally less than 100 meters for at least some of the most common WiFi configurations and applications and may be closer to or less than 10 meters.

WiFi-enabled mobile devices are generally configured to broadcast a probe request and wait for a response from a wireless access point that receives, detects, or is within range of the probe request. Each wireless access point that detects the probe request may reply by sending a probe response typically including a network identifier and other information. The network identifier included in a probe response from a WiFi compliant wireless access point may be referred to as a service set identifier (SSID) and WiFi-enabled mobile devices may be configured to respond to detecting the SSID in the response by connecting to the wireless access point that transmitted the response. In this manner, the physical wireless access point is closely associated the physical wireless cell and with the SSID associated with that cell. If a mobile device is within range of two or more WiFi enabled wireless access points, the mobile device may be configured to select one of the two or more wireless access points in accordance with selection protocol, e.g., connect to the wireless access point with the strongest SSID signal.

In conventional WiFi deployments, the mobile device controls the process of establishing a WiFi connection with a wireless access point. When a large number of mobile devices are located in close proximity to a particular wireless access point, each mobile device may attempt to connect to that wireless access point, potentially resulting in excessive loading of the wireless access point.

Mobile devices are also generally configured with functionality for terminating an existing WiFi connection in favor of a new connection when the strength of the existing connection drops below a threshold and a new and stronger connection is present. Conventional WiFi handoff sequences, however, are generally too long or slow to support popular applications including broadband streaming applications.

BRIEF SUMMARY OF THE INVENTION

One aspect of subject matter disclosed herein is a virtual wireless network suitable for providing wireless connectivity to mobile devices located in a communicatively isolated environment. For purposes of this disclosure, a communicatively isolated environment, also referred to herein more simply as an isolated environment, includes any environment in which a mobile device using conventional WiFi connectivity resources is unable to establish an Internet connection, whether directly or through a public or private network that is coupled to the Internet, with sufficient bandwidth to support one or more applications being executed by the mobile device. Isolated environments may be entirely or substantially enclosed by a surrounding structure and/or remotely located. Non limiting examples of communicatively isolated environments include, without limitation: the interior of an aircraft in flight, on board a ship at sea, inside a tunnel or underground enclosure such as parking garage, or the like. Although virtual wireless networks disclosed herein are illustrated and explained with respect to a communicatively isolated environment within the interior of an in-flight aircraft, virtual wireless networks are equally applicable to other isolated environments.

Virtual wireless networks disclosed herein include a network controller, two or more wireless access points, and a broadband backbone interconnecting the network controller and the wireless access points. The network controller may include or interface with a gateway that couples the virtual wireless network to the Internet, whether directly or indirectly via one or more interim public or private network(s.) The broadband backbone includes one or more network switches and broadband interconnects interconnecting the wireless access points and the network controller. The broadband backbone may be implemented as an optical backbone and the broadband interconnects may include one or more optical fiber interconnects.

In at least some embodiments, the network controller includes a processor, a broadband interface suitable for coupling the processor to the broadband backbone, a gateway interface suitable for coupling the processor to the gateway resource, and memory and/or storage resources including processor-executable program instructions that, when executed by the processor, cause the network controller to perform operations that may be referred to herein as network control operations. The network control operations may include operations suitable for controlling the manner in which mobile devices connect to wireless access points. These operations may include operations for presenting, to mobile devices within the isolated environment, the plurality of physical wireless cells provided by the plurality of individual wireless access points as a single virtual wireless network and operations for managing the virtual wireless network and including operations for managing the wireless connections between mobile devices and wireless access points.

Each wireless access point may be configured to provide a wireless cell, i.e., a physical region, in proximity to the wireless access point, that supports a wireless communication connection. The plurality of wireless access points may be configured to perform certain wireless access point operations. The wireless access point operations may include broadcasting a network identifier, relaying probe requests received from one or more mobile devices requesting network access, and receiving, from the network controller, assignment information for at least one of the mobile devices requesting network access.

The assignment information received from network controller may include connection information indicating a wireless access point and a frequency channel assigned to the mobile device by the network controller. Upon receiving, from the network controller, assignment information assigning a mobile device to a wireless access point, the applicable wireless access point may then initiate and establish a wireless connection with the applicable mobile device. Similarly, when the strength of an existing wireless connection between a mobile device and a wireless access point weakens beyond a threshold value or other criteria, the network controller may re-assign the mobile device's wireless connection to another wireless access point. Delegating control of the handoff process to the network controller beneficially enables simplified and shortened handoffs because the resulting handoff can be accomplished without performing the seek and authenticate steps required in conventional handoff sequences controlled by the mobile device.

The network controller may be configured to respond to receiving one or more probe requests, relayed by one or more of the wireless access points, by determining wireless connection assignments for all or some of the mobile devices requesting wireless access. The network controller may determine wireless connection assignments based on various criteria and/or rules. For example, whereas conventional WiFi may result in wireless connections assigned or otherwise determined based exclusively or substantially on received-signal power, i.e., the mobile device establishes a wireless connection with the wireless access point providing the signal with the highest received-signal power, embodiments of network controllers disclosed herein may assign a mobile device to a "secondary" wireless access point, i.e., a wireless access point providing a signal with a received-signal power that is less than the received-signal power of one or more other wireless access points providing signals to the mobile device.

After determining a wireless connection assignment, the network controller may send a connection information message, instructing the applicable wireless access point to establish a wireless connection with the mobile device. The connection information message may indicate, as an example applicable to WiFi embodiments, the mobile device, the WiFi band, e.g., 2.4 GHz, 5 GHz, or 60 GHz, a frequency channel, and a security level, e.g., wired equivalence privacy (WEP), WiFi Protected Access (WPA), or WPA2 for the wireless connection. Other embodiments may include additional or different information sufficient to enable the wireless access point to establish a connection with the applicable wireless device. In some embodiments, the network controller may broadcast connection information messages to all wireless access points, in which case, the connection information message may indicate the wireless access point that will establish the wireless connection with the mobile device. In other embodiments, the network controller may address the connection information message to the applicable wireless access point, in which case the connection information message may omit an explicit indication of the applicable wireless access point. In some embodiments, the network controller may send all connection information messages to all or some of the wireless access points.

As previously suggested, each wireless access point provides a wireless cell and each wireless cell has a corresponding range. In at least some embodiments, the wireless access points are densely spaced within the isolated environment. In this context, densely spaced wireless access points may refer to environments in which the wireless cells provided by two or more wireless access points overlap. For example, if a first wireless cell generated by a first wireless access point, has a first radius, R1, and a second wireless cell generated by a second wireless access point has a second radius, R2, then the two wireless access points may be characterized as densely spaced or overlapping if the distance between the two wireless access points is less than the sum of R1 and R2. While densely spaced wireless access points may result in an undesirably high number of handoffs in a conventional environment, the virtualized wireless network disclosed herein may utilize the dense spacing to permit the network controller to assign wireless connections based on one or more parameters other than signal strength. For example, when a mobile device is within range of two wireless access points with relatively little difference in signal strength, the network controller may assign the mobile device to the wireless access point with the modestly weaker signal to achieve or recognize another performance parameter such as loading.

In one aspect of the virtual wireless network, each of the wireless access points may be configured to broadcast a common network identifier, security level, and/or media access channel address. The frequency channel assigned to a particular connection may represent one of a plurality of frequency channels within a standard-specified frequency band associated with the wireless network. In such embodiments, receiving probe requests may include receiving one or more sets of coordinated probe requests, wherein each set of coordinated probe requests includes a probe request corresponding to each of the frequency channels. In conventional WiFi implementations, a mobile client joins a WiFi network by sending probe requests on one of the supported frequency channels. If the mobile device does not receive a probe response within a timeout interval, the mobile device resends the probe requests on another one of the supported frequency channels. For 2.4-GHz WiFi within the United States, as a non-limiting example, 11 frequency channels are employed. Conventionally, as soon as a mobile device receives a probe response from an access point on a particular frequency channel, the mobile device starts the association process. In at least some embodiments of a WiFi network system disclosed herein, access points receiving probe requests from a mobile device do not immediately send a probe response to the mobile device. Instead, each access point relays the probe requests it receives to the network controller. Because the mobile device will not receive any probe response within the timeout interval, the mobile device will send a subsequent probe request on the next frequency channel and the access points will, again, relay those probe requests to the network controller. In this manner, each mobile device requesting access may send a probe request for each of the 11 frequency channels and each access point may forward 11 probe requests per mobile device to the network controller. As a result, the network controller obtains a global view of the network's access state.

With its global view of network's wireless access state, the network controller is uniquely suited to assign access points and frequency channels to mobile devices to achieve one or more objectives pertaining to latency, bandwidth, signal strength, access point loading or any other suitable parameter or parameters. In at least one embodiment, the network controller maintains information indicative of each wireless cell's overall usage and determines, based at least in part on the usage information, which access point to assign to a mobile device that sends a new access request or to an existing mobile device as it roams within the isolated environment.

The network controller's full knowledge of the probing results for all access points and frequency channels enables the network controller to support a priority connection feature in which the wireless connection assigned to a mobile device encompasses two or more access points wherein the two or more access points may simultaneously transmit information to the mobile device over a common frequency channel.

BRIEF DESCRIPTION OF THE SEVERAL VIEWS OF THE DRAWINGS

Drawings are not to scale unless stated so. Embodiments of methods, systems, and/or articles of manufacture disclosed herein are described with reference to the following figures, in which like reference numerals indicate like elements unless indicated otherwise and in which a hyphenated form of reference numeral indicates an instance of the corresponding element, which may also be referenced generically or collectively with an un-hyphenated form of the reference numeral. e.g., . . . a first widget 11-1 and a second widget 11-1 . . . wherein each widget 11 includes . . . . and wherein widgets 11 further include . . . .

DETAILED DESCRIPTION

Figure 1:
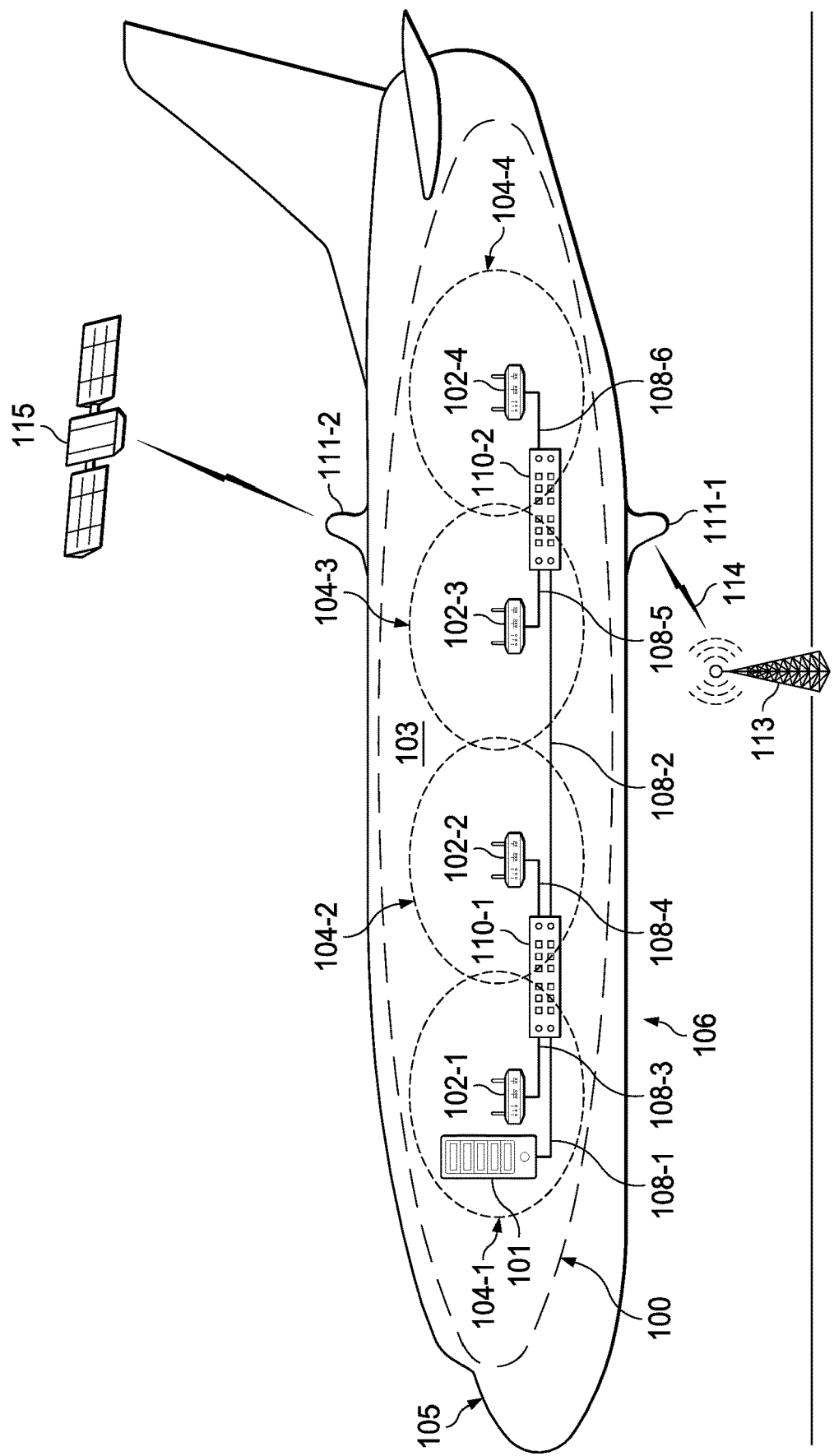
FIG. 1 illustrates an exemplary virtual wireless network implemented with an isolated environment represented by the interior of an aircraft.

The figures referenced above and the written description of specific structures and functions below are not presented to limit the scope of what the Applicant has invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation location and vary from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. The illustrated number of items of a particular component, element, or step can vary and the illustration is not limiting. Further, the various methods and embodiments of the system can be included in combination with each other to produce variations of the disclosed methods and embodiments. Discussion of singular elements can include plural elements and vice-versa. References to at least one item or to one or more items may refer to one item or to multiple items. Also, various aspects of the embodiments could be used in conjunction with each other to accomplish any disclosed objectives, advantages, or benefits. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

FIG. 1 illustrates an exemplary virtual wireless network 100 in accordance with subject matter disclosed herein. The virtual wireless network 100 illustrated in FIG. 1 includes a network controller 101 communicatively coupled to a plurality of wireless access points 102 within an isolated environment 103. As depicted in FIG. 1, the isolated environment 103 is the interior of aircraft 105. Each wireless access point 102 within the isolated environment 103 illustrated in FIG. 1 provides, establishes, and/or maintains a wireless cell 104. Each wireless cell 104 (104-1, 104-2, and 104-3) has a characteristic radius that is roughly indicative of the extent of the wireless cell, although a wireless cell 104 may extend farther in some directions than in other directions. For example, a wireless cell 104 may have an elliptical cross-section or be non-spherical in other ways. The shape or extent of a wireless cell 104 may be influenced by the boundaries of the isolated environment. For example, in an isolated environment defined by an aircraft, portions of one or more of the wireless cells 104 may terminate at the walls of the aircraft. In addition, even where not constrained by boundaries of the isolated environment, the radius may depend on numerous factors including, as a non-limiting example, the frequency band of the applicable communication protocol. For embodiments that employ WiFi, a wireless cell 104 may have one radius in the 2.4 GHz band, e.g., 802.11b/g/n, a second radius in the 5 GHz band, for example, 802.11a/n/ac/ax, and a third radius in the 60 GHz band, and so forth. In a dense configuration, the separation between adjacent wireless access points 102 may be far less than the radius of the cells 104 provided by each wireless access point 102. In such configurations, the wireless cells 104 overlap and, in at least some embodiments disclosed herein, overlap significantly for 2.4 GHz and 5 GHz WiFi. Each frequency band may include multiple frequency channels. For example, as implemented in the United States, 2.4 GHz WiFi includes 11 overlapping frequency channels while 5 GHz WiFi includes at least 23 non-overlapping channels. In WiFi implementations, the radius of each wireless cell 104 may be approximately 30 meters for 2.4 GHz and 5 GHz and 10 meters or less for 60 GHz. Beyond the radius of each wireless cell 104, signal attenuation may be gradual, resulting in considerable overlap between adjacent wireless cells 104, or rapid, resulting in less overlap between adjacent cells. For example, a wireless access point may maintain 2.4, 5, and 60 GHz and, in at least some embodiments, the 2.4 GHz and 5 GHz cells overlap considerably, wireless cells 104 may have considerable overlap.

The wireless access points 102 illustrated in FIG. 1 are communicatively coupled to a network controller 101 via a broadband infrastructure referred to herein as broadband backbone 106. The broadband backbone 106 illustrated in FIG. 1 interconnects four wireless access points 102 (102-1, 102-2, 102-3, and 102-4) and network controller 101 via two network switches 110 (110-1 and 110-2) and a group of broadband interconnects 108. Each wireless access point 102 is coupled to one of the network switches 110 and the two network switches 110 are interconnected. As depicted in FIG. 1, the broadband interconnects 108 include first broadband interconnect 108-1 connecting network controller 101 and first network switch 110-1, second broadband interconnect 108-2 connecting first network switch 110-1 and second network switch 110-2, third broadband interconnect 108-3 connecting first wireless access point 102-1 and first network switch 110-1, fourth broadband interconnect 108-4 connecting second wireless access point 102-2 and first network switch 110-1, fifth broadband interconnect 108-5 connecting third wireless access point 102-3 and second network switch 110-2, and sixth broadband interconnect 108-6 connecting fourth wireless access point 102-4 and second network switch 110-2. Although FIG. 1 depicts a commercial aircraft with four wireless access points 102, the wireless network 100 illustrated in FIG. 1 may be deployed in larger or smaller aircraft with more or fewer wireless access points 102 and more or few network switches 110. In at least some embodiments, each broadband interconnect 108 may be implemented with an optical fiber or a pair of optical fiber cables that form an optical fiber ring. In these embodiments, network switches 110 have broadband Ethernet and optical fiber switching capability.

One or more antennas 111 affixed to an exterior of aircraft 105 are coupled to network controller 101. The aircraft 105 illustrated in FIG. 1 includes a first antenna 111-1 affixed to a landward surface of aircraft 105 for communicating with a cellular tower 113 via direct air to ground (ATG) communication 114. The illustrated aircraft 105 also includes a second antenna 111-2, affixed to a skyward surface of aircraft 105, for communicating with a communications satellite 115. Other aircraft not depicted in FIG. 1 may include one or more ATG antennas only or one or more satellite antennas only.

FIG. 1 illustrates closely spaced wireless access points 102 generating wireless cells 104 that overlap and possibly, overlap considerably. Again, each wireless access point 102 illustrated in FIG. 1 generates, supports, and corresponds to a distinct or physical wireless cell 104. In general, assuming that the wireless access points 102 within isolated environment 103 all have comparable performance characteristics, mobile devices will connect to the closest wireless access point 102 for good wireless signal quality. While connecting to the closet signal is inherently sensible for conventional environments, in which a mobile device often in close proximity to one or a small number of wireless access points that are clearly stronger than other available signals, a closest-connection convention, if employed within an isolated environment 103 of densely spaced wireless cells 104 may result in an unbalanced loading under conditions wherein overall performance might be improved by implementing connections in a non-traditional manner. As a simple example, ten mobile devices may be sufficiently close to two wireless access points wherein the difference in signal strength between the first and second wireless access points is not too considerable for any the applications being executed by any of the ten devices. In this illustration, overall performance may be improved by distributing the connections such that, for example, six of the ten mobile devices connect to the first wireless access point while four of the ten devices connect to the second wireless access point. In contrast, a conventionally implemented wireless network may connect all devices to the wireless access point with the stronger, albeit only marginally stronger, signal thereby potentially overloading one of the wireless access points while underutilizing the other wireless access point.

Figure 2:
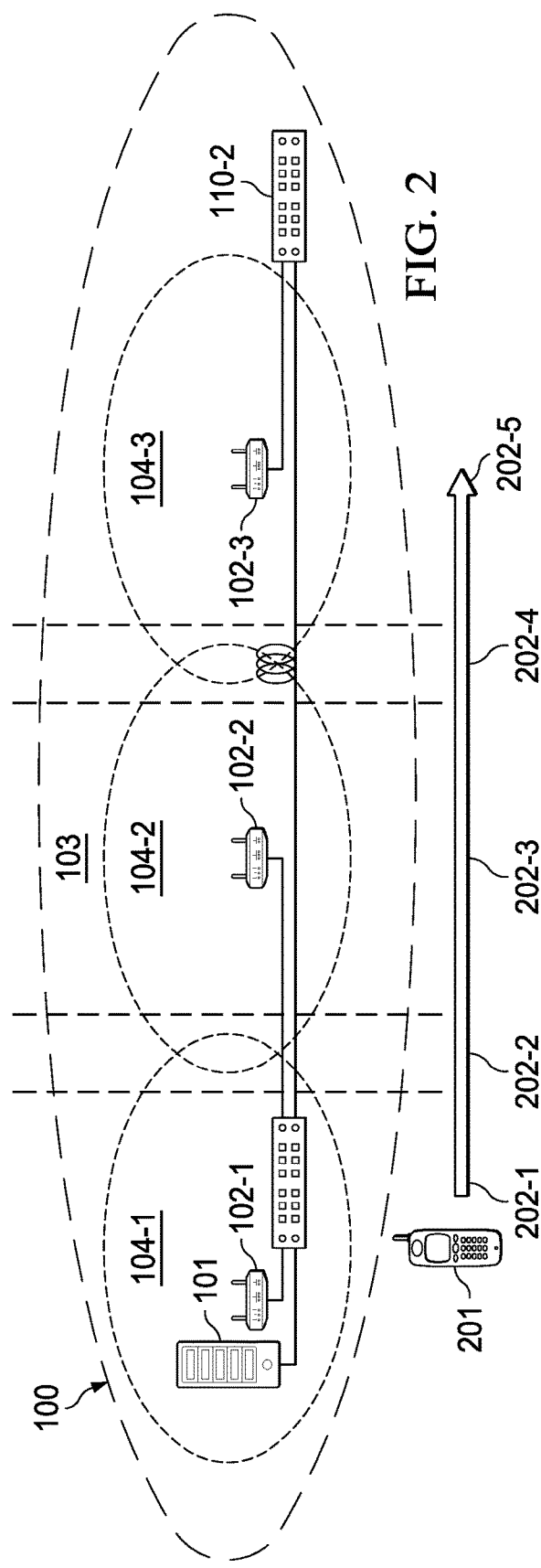
FIG. 2 illustrates a mobile device roaming within the virtualized wireless network of FIG. 1.

FIG. 2 illustrates a mobile device 201 moving or roaming, within a virtual wireless network 100, from a first position 202-1, through intermediate positions 202-2, 202-3, and 202-4, to a final position 202-5. For the sake of clarity, mobile device 201 is illustrated below virtual wireless network 100, but those of ordinary skill in the field will appreciate that FIG. 2 represents mobile device 201 moving or roaming within virtual wireless network 100 and its wireless cells 104. Those of ordinary skill will also notice that the virtual wireless network 100 illustrated in FIG. 2 has three wireless access points 102 and three corresponding wireless cells 104 where the virtual wireless network 100 illustrated in FIG. 1 includes four wireless access points 102 and four corresponding wireless cells 104. This distinction illustrates one aspect of the flexibility or configurability of virtual wireless network 100.

Each wireless access point 102 may be configured to broadcast a network identifier that is detectable by mobile device 201. In WiFi embodiments, these network identifiers may consist of, or be included within an SSID broadcast by each wireless access point 102. In at least one WiFi embodiment, network controller 101 has configured each wireless access point 102 to have the same media access control (MAC) address and to broadcast the same SSID.

In at least some embodiments, including WiFi embodiments, mobile device 201 is configured to discover wireless networks by transmitting one or more probe requests. A wireless access point 102 within range of a mobile device 201 that is transmitting a probe request may determine from the probe request whether the mobile device is compatible, e.g., whether the mobile device supports one or more data rates supported by the wireless access point. If a wireless access point in a conventional WiFi network determines that a mobile device is compatible, the wireless access point may respond to the probe request by transmitting a probe response advertising the wireless access point's network identifier.

In conventional WiFi environments, a mobile device may send a first probe request via a first channel of the applicable frequency band and await a probe response. If no probe response is received within a specific interval of time, the mobile device may send a second probe request via a second channel of the frequency band. However, in at least some embodiments of virtual wireless network 100 as disclosed herein, wireless access points 102 do not respond to a probe request from mobile device 201 by sending a probe response back to mobile device 201, but instead relay all probe requests to network controller 101. Accordingly, in these embodiments, because mobile device 201 will not receive responses to its probe requests, mobile device 201 will issue a set of probe requests wherein a set of probe requests includes a probe request sent for each frequency channel supported by the applicable protocol. For example, in the case of a 2.4 GHz WiFi (US) wireless access point, mobile device 201 may send eleven probe requests, each of which is received by wireless access point 102-1 and relayed to network controller 101.

Within the isolated environment 103 illustrated in FIG. 2, the only network identifier detected by mobile device 201 at first position 202-1 is the network identifier broadcast by first wireless access point 102-1. Thus, mobile device 201 may issue a set of probe requests, including one probe request for each applicable frequency channel, each of which is received by, and only received by first wireless access point 102-1, which may be configured to relay the requests on to network controller 101. Network controller may be configured to assign a wireless connection to mobile device 201, i.e., determine which wireless access point 102 and frequency channel to use for a wireless connection with mobile device 201. The algorithm or rules used by network controller 101 to make this assignment are discussed elsewhere herein, but may be based on or influenced by existing loading of the various wireless access points. In at least some instances, network controller 101 may assign mobile device 201 to a wireless access point other than the nearest wireless access point and/or the access point with the strongest network identifier signal. In the particular case illustrated in FIG. 2, because mobile device 201 is in range of first wireless access point 102-1 only, network controller 101 will assign mobile device 201 to first wireless access point 102-1.

When mobile device 201 moves reaches the second position 202-2 illustrated in FIG. 2, mobile device 201 will be within range of more than one wireless access point 102. Specifically in this case, mobile device 201 will be within range of first wireless access point 102-1 and second wireless access point 102-2. In addition, network controller 101 may be monitoring the signal strengths of the wireless connections of each mobile device 201 connected to virtual wireless network 100. The signal strength information received by network controller 101 may be signal strength information generated by mobile device 201 or signal strength information generated by a wireless access point 102. If the strength of a mobile device's existing connection drops below some threshold value or otherwise fails to satisfy one or more signal strength criteria, network controller may initiate a handoff on behalf of mobile device 201.

In at least one embodiment, the handoff process initiated by network controller 101 is beneficially simpler and shorter in duration than conventional WiFi handoff processes. In conventional cellular networks, including conventional WiFi, when a mobile device moves outside the usable range of a first wireless cell, referred to herein as the waning cell, associated with a first wireless access point, referred to herein as the waning wireless access point, it connects to a second wireless cell, referred to herein as the waxing cell, associated with a second wireless access point, referred to herein as the waxing wireless access point. Conventional WiFi handoff processes include scanning operations, authentication operations, and re-association operations. Delay and/or latency associated with conventional WiFi handoffs may be at least partially attributable to the mobile device itself, which determines when to initiate a handoff and disconnect from a waning cell. Although the magnitude of the delay associated with a conventional WiFi handoff may be influenced by many factors, a WiFi handoff delay of or exceeding 500 milliseconds is not to be unexpected. For at least some applications, the handoff delay may have a perceptible negative impact on performance and/or quality.

In at least one embodiment, the handoff process initiated by network controller 101 when the signal strength of the wireless connection between mobile device 201 and first wireless access point 102-1 weakens sufficiently, may require only one of the three categories of operations described above. Specifically, the network-controller-initiated handoff process may omit the scanning operations and authentication operations of conventional WiFi handoffs, at least in part because network controller already knows what wireless cells are present and because each available wireless cell has the same authentication parameters.

In this manner, network controller 101 may assign mobile device 201 to a wireless connection with second wireless access point 102-2 as mobile device 201 moves further from first wireless access point 102-1 and closer to second wireless access point 102-2. Moreover, by eliminating the seeking intervals and authentication intervals of conventional WiFi handoff sequences, the handoff initiated by network controller 101 may be sufficiently brief to permit uninterrupted service even when mobile device is executing a high bandwidth application such as a streaming voice over IP application. As mobile device continues to third position 202-3, network controller 101 may maintain the existing connection between mobile device 201 and second wireless access point 102-2. When mobile device 201 arrives at fourth position 202-4, the existing wireless connection signal strength may have dropped below the applicable threshold, in which case network controller 101 initiates a second abbreviated handoff sequence to disconnect mobile device 201 from second wireless access point 102-2 and connect mobile device 201 to third wireless access point 102-3. Similar to the earlier handoff, this handoff can occur without requiring the scanning operation, authentication operation, or both as is required in conventional handoffs. This wireless connection then persists as mobile device 201 moves from fourth position 202-4 and arrives at is final destination at fifth position 202-5.

In some embodiments, virtual wireless network 100 is compatible with the conventional WiFi configurations of mobile devices 201. In these embodiments, few if any modifications of the mobile device's WiFi connectivity resources and code is required because mobile devices within virtual wireless network 100 perceive only one available WiFi network and, therefore, do not initiate any handoffs. In this manner, the wireless network 100 is implemented without requiring or imposing any change in the WiFi or other suitable local wireless interface of the mobile devices.

Figure 3:
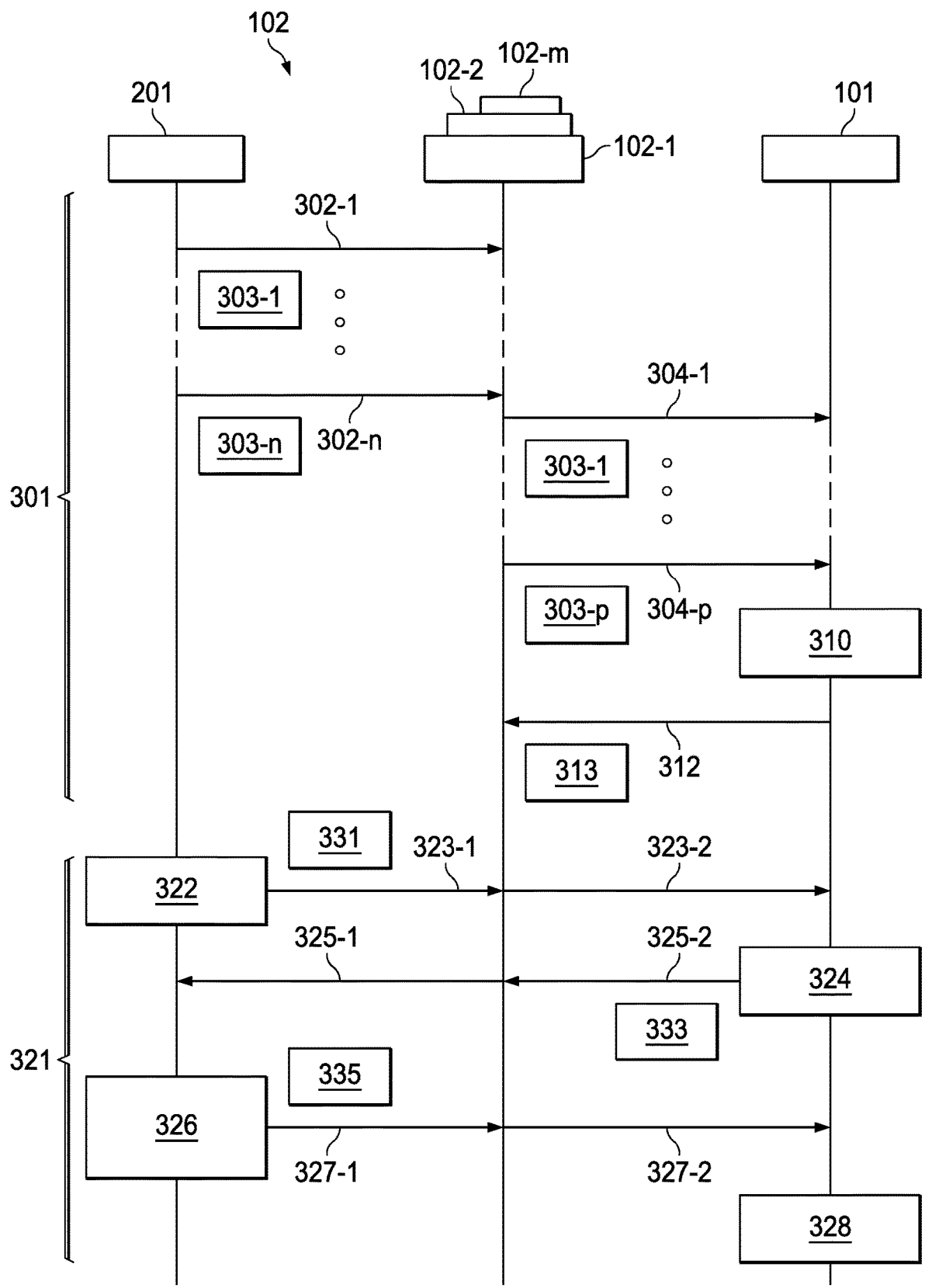
FIG. 3 is an exemplary flow sequence diagram illustrating a mobile device joining and roaming the virtualized wireless network of FIG. 1.

FIG. 3 is a flow sequence diagram illustrating operations performed by and information exchanged between a mobile device 201 and virtual wireless network components including network controller 101 and a plurality of wireless access points 102-1 through 102-m. For the sake of clarity, FIG. 3 illustrates only one mobile device 201 and its corresponding wireless network operations. It will be appreciated however that the virtual wireless network supports multiple mobile devices and that each mobile device may be associated with operations analogous to those illustrated in FIG. 3. The operations illustrated in FIG. 3 include network joining operations 301 and network roaming operations 321. The network joining operations 301 include one or more probe request broadcasting operations (302-1 through 302-n) performed by mobile device 201, one or more request forwarding operations (304-1 through 304-p) performed by one or more of the wireless access points 102-1 through 102-m, and an assignment determination operation 310 and an assignment sending operation 312 performed by network controller 101. The network roaming operations 321 illustrated in FIG. 3 include a signal monitoring operation 322 performed by mobile device 201, a re-assignment operation 324 performed by network controller 101, association operations 326 performed by mobile device 201, and disassociation operations 328 performed by network controller 101.

As illustrated in FIG. 3, mobile device 201 attempts to establish access to the Internet or another public or private wide area network by first attempting to establish a wireless connection with a wireless access point 102 by broadcasting or otherwise wirelessly transmitting one or more probe requests 303. At the time mobile device 201 illustrated in FIG. 3 broadcasts probe requests 303, mobile device 201 may be within range of multiple wireless access points 102 including, in the illustrated example, wireless access point 102-1, wireless access point 102-2, and wireless access point 102-m. In at least some embodiments, each probe request broadcasting operation 302 includes mobile device 201 wirelessly broadcasting a probe request 303 on a particular frequency channel. Each individual probe request 303 may be received by any one or more of the wireless access points 102-1 through 102-m. In the most general case, each wireless access point 102 receives each individual probe request 303 broadcasted by mobile device 201. However, depending upon a variety of parameters including the transmitted power of each probe request 303, the physical dimensions of the isolated environment 103 (FIG. 2), the position, size, and composition of structures within the isolated environment, and so forth, any one or more of the probe requests 303 may go undetected by any one or more of the wireless access points 102.

As indicated previously, wireless access points 102 within virtual wireless network 100 may be configured to relay probe requests 303 to network controller 101 rather than returning a response to the mobile device 201. Because mobile device 201 receives no immediate responses to its probe requests 303, mobile device 201 is illustrated sending a set of "n" probe requests 303-1 through 303-n, wherein each probe request 303 is sent via a different frequency channel of the applicable signal band and wherein "n" represents the number of frequency channels that the wireless protocol supports. Accordingly, FIG. 3 illustrates wireless access points 102 forwarding probe requests 303 to network controller 101. In the most general case, wherein each of the "m" wireless access points 102-1 through 102-m receives each of the "n" probe requests 303-1 through 303-n, a total of "p" probe requests 303-1 through 303-p, are forwarded to network controller 101 wherein p is equal to the product of m and n. In U.S.-based implementations of 2.4 GHz WiFi, for example, mobile device 201 may send a set of 11 probe requests 303-1 through 303-11 (not expressly depicted in FIG. 3), including one probe request 303 for each of the eleven frequency channels specified or supported by the protocol.

In at least one embodiment, network controller 101 processes probe requests 303-1 through 303-p and assigns (operation 310), in accordance with one or more objectives and/or criteria, a wireless connection for the mobile device 201. Network controller 101 may then send (operation 312) wireless connection information 313 to one or more of the wireless access points 102. Wireless connection information 313 may include information indicating which wireless access point 102 and frequency channel have been assigned to the mobile device 201. In some embodiments, including embodiments in which network controller 101 sends wireless connection information 313 only to the applicable wireless access point 102, wireless access point information may be omitted from wireless connection information 313.

The network controller 101 illustrated in FIG. 3 may receive a complete set of probe requests 303 from each wireless access point 102 within range of mobile device 201. In such cases, network controller 101 may be described as receiving a complete set of probe requests for mobile device 201. Similarly, if FIG. 3 were modified to include a second mobile device wherein the second mobile device is requesting WiFi access, network controller 101 could receive a complete set of probe requests for this second mobile device as well. Accordingly, in at least some embodiments, network controller could receive a complete set of probe requests 303 from each mobile device 201 located within isolated environment 103 that requests wireless network access. In at least one embodiment, network controller 101 is configured to assign a wireless connection for each mobile device 201 seeking a wireless connection from any one or more of the wireless access points 102 of virtual wireless network 100.

Based at least in part on the complete set of probe responses received from the wireless access points 102 network controller may be configured to assign each mobile device 201 requesting network access to a specific wireless connection, i.e., assign each mobile device to a particular wireless access point 102 and a specific frequency channel. Moreover, network controller 101 may be configured to make connection assignments based on parameters or criteria in addition to signal strength. For example, network controller 101 may be configured to assign (operation 310) network connections to maintain a desired clustering of mobile devices and wireless access points and a desired distribution of wireless access points and frequency channels. As a simple example, network controller may receive probe requests indicating that two mobile devices are requesting network access where each mobile device is closest to a first wireless access point 102-1 and each mobile device is next closest to a second wireless access point 102-2. If network controller determines or otherwise detects that the difference in strength between the first wireless access point 102-1 and the second wireless access point 102-2 is too small to result in a substantial difference in performance, network controller 101 may determine that load balancing the probe requests across two different wireless access points 102 is preferable to assigning both probe requests to a single wireless access point even when that wireless access point provides the strongest signal to both mobile devices.

In some embodiments, network controller 101 may be configured to assign wireless connections based, at least in part, on network usage information provided by one or more of the mobile devices. In at least one embodiment, mobile devices 201 report usage information to their respect wireless access points and the wireless access points forward this information to network controller 101. Network controller 101 may use this information to estimate or determine the overall usage of each wireless cell. When it later becomes necessary or desirable to assign a roaming mobile device 201 to a different wireless access point 102, network controller 101 may use this usage data to influence the selection of a new wireless access point. In at least one WiFi embodiment that supports IEEE 802.11k, the usage information may be conveyed to network controller 101 via neighbor report information provided by the mobile devices 201.

The ability to assign wireless connections based on multiple parameters is particularly valuable when the wireless access points 102 within an isolated environment 103 have significant overlapping coverage. Significant coverage overlap suggests that the signal strengths of the overlapping wireless access points are sufficiently close to justify wireless connection assignments that would not be made based solely on signal strength.

Referring now to the network roaming operations 321 illustrated in FIG. 3, mobile device 201 may monitor (operation 322) one or more operational parameters associated with the mobile device's wireless connection including, as a common but non-limiting example, the RSSI of the mobile device's wireless connection. Mobile device 201 may forward (operation 323-1) operational parameter information 331, including but not limited to RSSI information, to wireless access point 102, which may then forward (operation 323-2) operational parameter information 331 to network controller 101. Whenever network controller 101 determines (operation 324) that a mobile device is ready for a wireless connection handoff, network controller 101 may be configured to convey (operations 325-1, 325-2) a new wireless connection assignment 333 to the mobile device. In addition, because the network controller 101 oversees all wireless connections, network controller 101 can employ an abbreviated handoff sequence that omits a scanning interval, an authentication interval, or both. Instead, once network controller 101 decides that a new wireless connection is required for a mobile device, the applicable mobile device is informed of the new wireless connection assignment 333 and the mobile device may then simply associate (operation 326) with the new wireless connection. The mobile device may then forward (operations 327-1, 327-2) a message confirming the new connection to network controller 101 via wireless access point 102. Upon receiving the confirmation message, network controller 101 may then disassociate (operation 328) the previous wireless access point 102 from mobile device 201.

Figure 4:
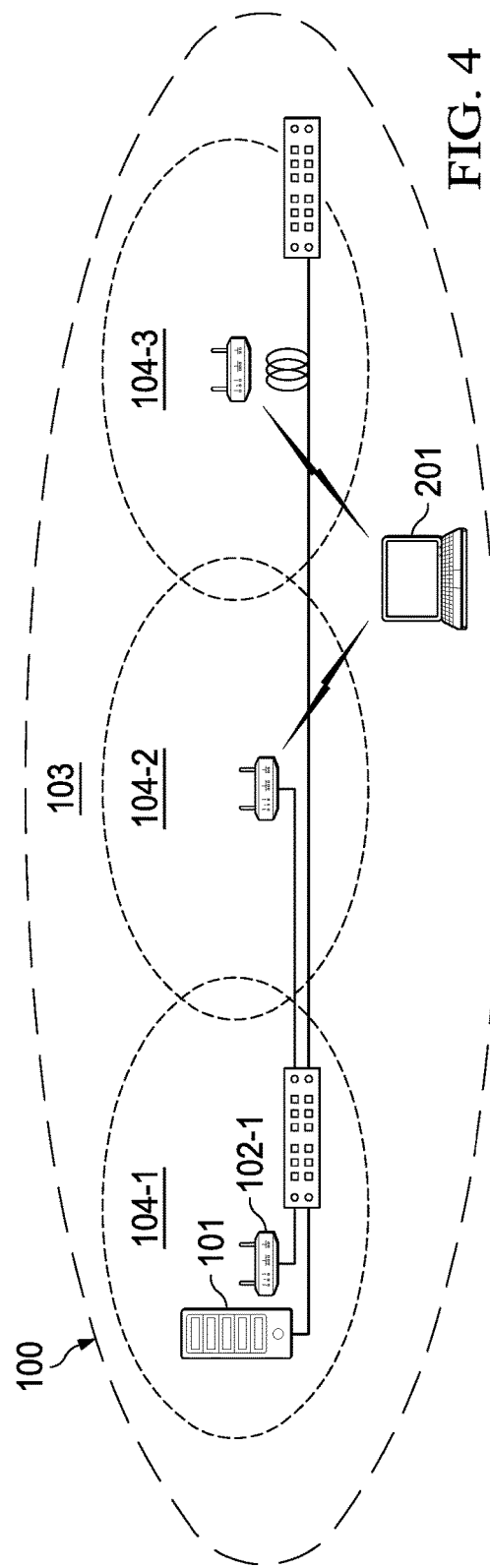
FIG. 4 illustrates prioritized coordinated multiport transmission within the virtualized wireless network of FIG. 1.

FIG. 4 illustrates coordinated multipoint transmission that may be used when there is significant overlap of two or more wireless access points 102. In the illustrated example, wireless access point 102-2 and 102-3 simultaneously transmit to mobile device 201 positioned in close proximity to both wireless access points. The simultaneous transmission may utilize the same frequency channel for each wireless access point 102 to achieve high-throughput communication with improved received signal quality. The network controller 101 coordinates the multipoint transmission and can implement multipoint transmission as a prioritized service. For example, multipoint transmission may be offered as a prioritized service and may be made available to selected passengers as a reward or inducement, e.g., reward or inducement to purchase first class seating.

Figure 5:
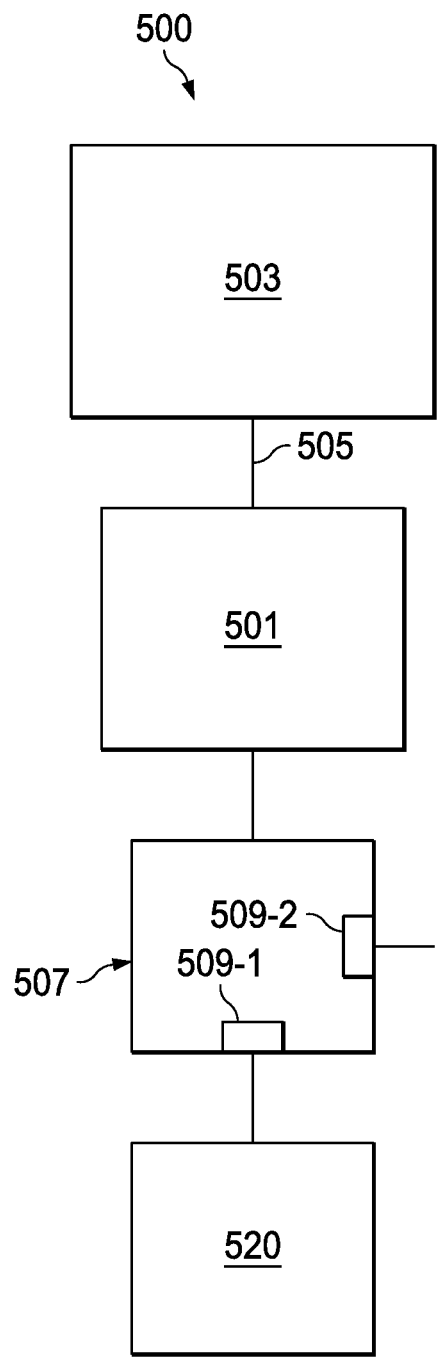
FIG. 5 is a block diagram of an exemplary server suitable for the network controller.

FIG. 5 illustrates a block diagram of an exemplary server 500 or other computing resource suitable for use as network controller 101. The elements of server 500 illustrated in FIG. 5 include a processor 501 coupled to a system memory 503 by a memory interface 505 and a chip set 507, including one or more interface adapters 509 (509-1 and 509-2), and a gateway 520 coupled to one of the interface adapters 509. System memory 503 may include volatile, random access memory (RAM), nonvolatile memory including flash memory devices, or both. System memory 503 may store data and/or processor-executable instructions. The chipset device 507 illustrated in FIG. 5 includes a gateway interface adapter 509-1, coupling gateway 520 to processor 501, and a broadband interface adapter 509-2 suitable for coupling processor 501 to the broadband backbone 106 (FIG. 1).

System memory 503 and/or other storage resources not explicitly depicted in FIG. 5, may include processor-executable program instructions that, when executed by processor 501, cause server 500 to perform network control operations. The network control operations may include operations suitable for controlling the manner in which mobile devices connect to wireless access points as discussed above with respect to FIG. 1 through FIG. 4. These operations may include operations, such as those illustrated in FIG. 2 through FIG. 4, for presenting, to mobile devices within an isolated environment, the plurality of physical wireless cells provided by the plurality of individual wireless access points as a single virtual wireless network and operations for managing the virtual wireless network and including operations for managing the wireless connections between mobile devices and wireless access points.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A method comprising:
configuring a plurality of wireless access points, positioned within a defined environment wherein each of the plurality of wireless access points is within range of at least one of the remaining wireless access points, to perform probe request handling operations comprising:
responsive to receiving a probe request broadcasted by a mobile device located within the defined environment, relaying the probe request to a network controller; and
responsive to receiving a probe response from the network controller, relaying the probe response to the mobile device;
configuring the network controller to provide a virtual wireless network by performing virtual wireless network operations responsive to receiving one or more probe requests relayed by one or more of the plurality of wireless access points, wherein the virtual wireless network operations include:
determining a selected wireless access point from the plurality of wireless access points and a selected frequency channel from a plurality of frequency channels; and
forwarding the probe response indicative of the selected wireless access point and the selected frequency channel to the selected wireless access point.

2. The method of claim 1, wherein configuring the wireless access points includes configuring each of the wireless access points to broadcast the same network identifier and security level.

3. The method of claim 1, wherein the method further includes:
configuring each of the plurality of wireless access points with the same media access channel address.

4. The method of claim 1, wherein a frequency channel of the probe request and the selected frequency channel both lie within the same frequency band.

5. The method of claim 4, wherein the plurality of frequency channels comprises a standard set of frequency channels associated with the frequency band and wherein the one or more probe requests received by the network controller include a set of coordinated probe requests, wherein the set of coordinated probe requests includes a probe request corresponding to each of the standard set of frequency channels.

6. The method of claim 1, wherein the selected wireless access point and the selected frequency channel are determined by the network controller in accordance with an objective comprising:
achieving a desirable distribution of selected frequency channels.

7. The method of claim 1, wherein the defined environment comprises an interior of an aircraft.

8. The method of claim 1, wherein the power of the probe request received by selected wireless access point is less than a power of the probe request received by at least one other wireless access point.

9. The method of claim 1, wherein the selected wireless access point is determined based, at least in part, on usage information provided by one or more of the plurality of wireless access points.

10. The method of claim 1, wherein relaying the probe request to the network controller comprises relaying the probe request via an optical fiber backbone.

11. The method of claim 10, wherein determining the selected wireless access point comprises identifying two or more selected wireless access points and a common frequency channel for a particular mobile device, and wherein the method further includes:
simultaneously transmitting, by the two or more wireless access points, to the particular mobile device.

12. A network controller comprising:
a processor;
a broadband interface coupled to the processor and configured to couple to a broadband interconnect;
a gateway interface coupled to the processor and configured to couple the processor to a gateway resource; and
a non-transitory computer readable storage medium including processor executable instructions that, when executed by the processor, perform operations comprising:
configuring a plurality of wireless access points, positioned within a defined environment wherein each of the plurality of wireless access points is within range of at least one of the remaining wireless access points, to perform probe request handling operations comprising:
responsive to receiving a probe request broadcasted by a mobile device located within the defined environment, relaying the probe request to a network controller; and
responsive to receiving a probe response from the network controller, relaying the probe response to the mobile device; and
responsive to receiving one or more probe requests relayed by one or more of the plurality of wireless access points, providing a virtual wireless network by:
determining a selected wireless access point from the plurality of wireless access points and a selected frequency channel from a plurality of frequency channels; and
forwarding the probe response indicative of the selected wireless access point and the selected frequency channel to the selected wireless access point.

13. The network controller of claim 12, wherein configuring the wireless access points includes configuring each of the wireless access points to broadcast the same network identifier and security level and the same media access channel address.

14. The network controller of claim 12, wherein the determining, by the network controller, of the selected wireless access point and the selected frequency channel occurs responsive to receiving probe requests relayed by two or more of the plurality of wireless access points.

15. The network controller of claim 12, wherein the selected frequency channel comprises one of a plurality of standard frequency channels within a standard frequency band associated with the wireless network, wherein a frequency channel of the probe request and the selected frequency channel both lie within the same standard frequency band.

16. The network controller of claim 15, wherein the one or more probe requests received by the network controller include a set of coordinated probe requests, wherein the set of coordinated probe requests includes a probe request corresponding to each of the plurality of standard frequency channels.

17. The network controller of claim 12, wherein the selected wireless access point and the selected frequency channel are determined by the network controller in accordance with an objective comprising:
achieving a desirable distribution of selected frequency channels.

18. The network controller of claim 12, wherein the power of the probe request received by the selected wireless access point is less than a power of the probe request received by at least one other wireless access point.

19. The network controller of claim 12, wherein the selected wireless access point is determined based, at least in part, on usage information provided by one or more of the plurality of wireless access points.

20. The network controller of claim 12, wherein the wireless access points and the network controller are interconnected via an optical fiber backbone.

21. The network controller of claim 20, wherein determining the selected wireless access point comprises identifying two or more selected wireless access points and a common frequency channel for a particular mobile device, and wherein the method further includes:
simultaneously transmitting, by the two or more wireless access points, to the particular mobile device.

22. An assembly, comprising:
a network controller coupled to a broadband backbone within a communicatively isolated environment; and
a plurality of wireless access points within the communicatively isolated environment and coupled to the broadband backbone, wherein each of the plurality of wireless access points is configured to provide a wireless cell and each wireless cell has a corresponding range and further wherein the plurality of wireless access points are positioned wherein at least one other wireless access point is within the range of each wireless access point;

wherein each of the plurality of wireless access points is configured to support a virtual wireless network by performing probe request handling operations comprising:

responsive to receiving a probe request broadcasted by a mobile device located within the defined environment, relaying the probe request to a network controller; and responsive to receiving a probe response from the network controller, relaying the probe response to the mobile device; and wherein the network controller is configured to provide the virtual wireless network by performing virtual wireless network operations responsive to receiving one or more probe requests relayed by one or more of the plurality of wireless access points, wherein the virtual wireless network operations include:

determining a selected wireless access point from the plurality of wireless access points and a selected frequency channel from a plurality of frequency channels; and forwarding the probe response indicative of the selected wireless access point and the selected frequency channel to the selected wireless access point.

23. The assembly of claim 22, further wherein each of the plurality of wireless access points is configured with the same media access channel address.

24. The assembly of claim 22, wherein each of the plurality of wireless access points is configured to broadcast the same network identifier.

25. The assembly of claim 22, wherein the relaying of the probe request to the network controller comprises relaying the probe request to the network controller rather than sending a probe response to the mobile device.

26. The assembly of claim 22, wherein the probe response is further indicative of the selected wireless access point.

27. The assembly of claim 26, wherein the forwarding of the probe response comprises forwarding the probe response to two or more of the plurality of wireless access points.

* * * * *